(12) United States Patent
Jacobs

(10) Patent No.: US 8,510,530 B1
(45) Date of Patent: Aug. 13, 2013

(54) MEMORY MANAGEMENT FOR PROGRAMS OPERATING ASYNCHRONOUSLY

(75) Inventor: Aaron Jacobs, Ashfield (AU)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 12/963,740

(22) Filed: Dec. 9, 2010

(51) Int. Cl.
*G06F 12/00* (2006.01)
(52) U.S. Cl.
USPC .......................................... 711/170; 711/163
(58) Field of Classification Search
None
See application file for complete search history.

(56) References Cited

U.S. PATENT DOCUMENTS

| | | | |
|---|---|---|---|
| 2004/0216094 A1* | 10/2004 | Bosworth et al. | 717/141 |
| 2010/0088476 A1* | 4/2010 | Inagaki et al. | 711/152 |

OTHER PUBLICATIONS

DaveOnCode; Baldovino, Tommaso; WordPress and Stardust; daveoncode.com/2009/11/23/automatically-compile-javascript-applications-using-google-closure-and-ant/; Sep. 24, 2012; Nov. 23, 2009; 4 pages.

\* cited by examiner

*Primary Examiner* — Shawn X Gu
(74) *Attorney, Agent, or Firm* — Fish & Richardson P.C.

(57) ABSTRACT

Methods, systems, and apparatus, including computer programs encoded on a computer storage medium, for managing memory for programs operating asynchronously. In one aspect, a method includes receiving, by a first process and from a second process that is asynchronous to the first process a request to perform operations; and a first callback referencing an executable portion of the second process; generating a wrapper callback referencing the first callback, the wrapper callback configured to deallocate a referenced memory location and cause execution of the referenced first callback when the wrapper callback is executed; and in response to performing operations based on the request, the operations including allocating the referenced memory location, executing the wrapper callback, including executing the first callback and deallocating the referenced memory location subsequent to executing the first callback.

15 Claims, 4 Drawing Sheets

MEMORY MANAGEMENT FOR PROGRAMS OPERATING ASYNCHRONOUSLY

BACKGROUND

This subject matter of this specification relates to memory management for programs operating asynchronously.

Computer systems operate multiple programs concurrently. On a single-microprocessor system, one program may be active while other concurrently operating programs may be inactive. On a multi-microprocessor system, multiple concurrently operating programs may be active. In some cases, multiple concurrently operating programs may share the same resource available on the computer system. For example, two concurrently operating programs may use the same portion of computer memory available on the computer system.

The concurrently operating programs also may be operating asynchronously relative to each other, such that they carry out operations independently of one another. However, when concurrently operating programs share a resource, such as memory, the programs may need to coordinate their respective use of the shared resource.

SUMMARY

The subject matter of this specification relates to managing memory allocation among multiple programs operating asynchronously.

In general, one aspect of the subject matter described in this specification can be embodied in a method that receives, by a first process and from a second process that is asynchronous to the first process, a request to perform operations, and a first callback referencing an executable portion of the second process; generates a wrapper callback referencing the first callback, the wrapper callback configured to deallocate a referenced memory location and cause execution of the referenced first callback when the wrapper callback is executed; and in response to performing operations based on the request, the operations including allocating the referenced memory location, executes the wrapper callback, including executing the first callback and deallocating the referenced memory location subsequent to executing the first callback.

Other embodiments of this aspect include corresponding systems, apparatus, and computer program products.

These and other embodiments can each optionally include one or more of the following features. The wrapper callback includes a reference to a container object referencing a plurality of memory locations to be deallocated, the memory locations having been allocated by the first process, and the references to the memory locations having been added to the container object by the first process. The embodiment also includes checking a mutual exclusion variable prior to adding a reference to a memory location to the container object; and if the mutual exclusion variable indicates that the container object is not in use, adding a reference to the memory location to the container object; and if the mutual exclusion variable indicates that the container object is in use, waiting until the mutual exclusion variable changes, and when the mutual exclusion variable indicates that the mutual exclusion variable indicates that the container object is not in use. The plurality of memory locations represents a plurality of objects of multiple types. The second process includes a web server and the first process includes a service that processes data received from the web server.

In general, another aspect of the subject matter described in this specification can be embodied in a computer storage medium encoded with instructions executable by a computer, the instructions including a specification of a container object that can be implemented in a process that receives requests and provides responses, the requests causing generation of objects, at least some of the objects having an object type and wherein upon such execution the instructions cause the computer to perform operations including receiving a reference to a container object defined by the specification for accepting references to memory locations, the container object being independent of a type of an object; and providing, to the container object, a reference to a memory location of an object.

These and other embodiments can each optionally include one or more of the following features. The specification of the container object includes a specification of a mutual exclusion variable, and the instructions also cause the computer to perform operations including executing a plurality of threads each performing operations, wherein the operations of at least two of the plurality of threads each includes, if the mutual exclusion variable indicates that the container object is not in use, adding a reference to the memory location to the container object; and if the mutual exclusion variable indicates that the container object is in use, waiting until the mutual exclusion variable changes, and when the mutual exclusion variable indicates that the mutual exclusion variable indicates that the container object is not in use. The instructions also cause the computer to perform operations including generating a wrapper callback referencing the container object, the wrapper callback configured to deallocate the memory locations referenced by the container object.

Particular embodiments of the invention can be implemented to realize one or more of the following advantages. Asynchronous programs can share a memory location and avoid a memory leak. Memory locations containing software objects of any type can be added to a garbage bin for deallocation.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A software program allocates computer memory while processing requests and responses. After the software program has finished responding to a request, the allocated memory may need to remain allocated for some period of time, and eventually the memory will need to be deallocated. For example, the allocated memory may need to be accessible to a calling process that made the request. However, if the software program is executing asynchronously to the calling process, the last step that the software program performs may be a callback to the calling process to notify the process that the request has been handled and the response is ready. In this case, the software program has no opportunity to deallocate the memory after it is used by the calling process, and if the calling processes does not deallocate the memory, then the memory may be lost to a memory leak.

Generally, the calling process does not deallocate the memory, so the software program needs to keep track of the allocated memory and ensure that it is deallocated at some point after the software program itself has finished its tasks and performed the callback to the calling process. One way to streamline the memory deallocation is to deallocate all of the memory at once after the software program has finished responding to a request. The callback can also be used to deallocate the memory all at once, separately from the software program.

When the software program receives the callback, it can create a new wrapper callback that contains the original callback and also contains a second callback that deallocates referenced memory. When it is time to return to the calling process, the software program calls the wrapper callback, which executes the original callback and then deallocates the memory. Sometimes the memory that will be allocated (and thus will need to be deallocated) is known when the software program begins handling a request, and the reference to that memory can be added to the wrapper callback when the wrapper callback is initialized. At other times, the memory that will be allocated is not known in advance. During these times, the software program can create a container object (e.g., a "garbage bin") include a reference to the garbage bin in the wrapper callback. As the software program performs its operations, it can add references to allocated memory to the garbage bin even after the wrapper callback is created. The wrapper callback will thus still be able to deallocate the memory in the garbage bin.

Figure 1:
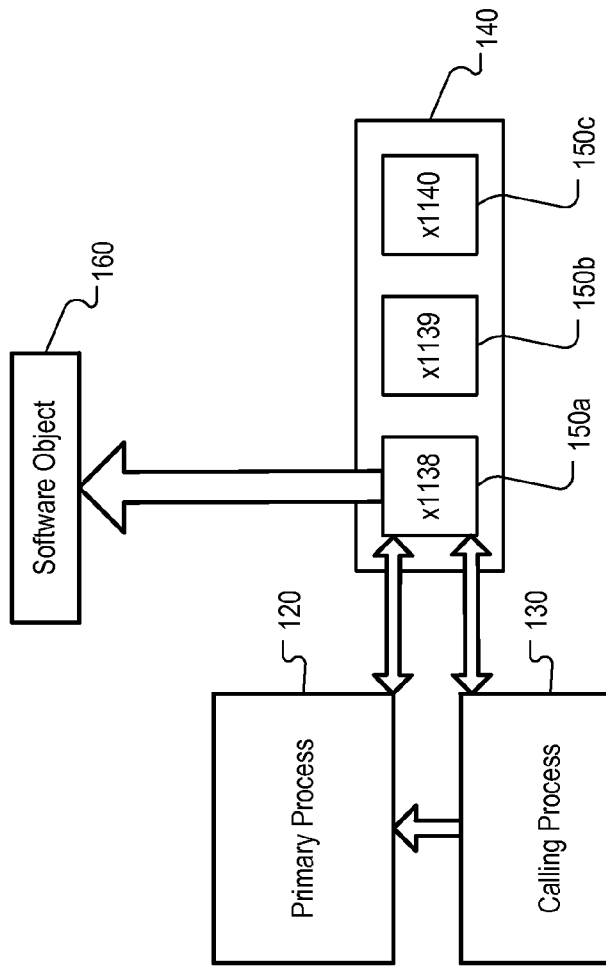
FIG. 1 is a block diagram of processes executing within a server.
Figure 1:
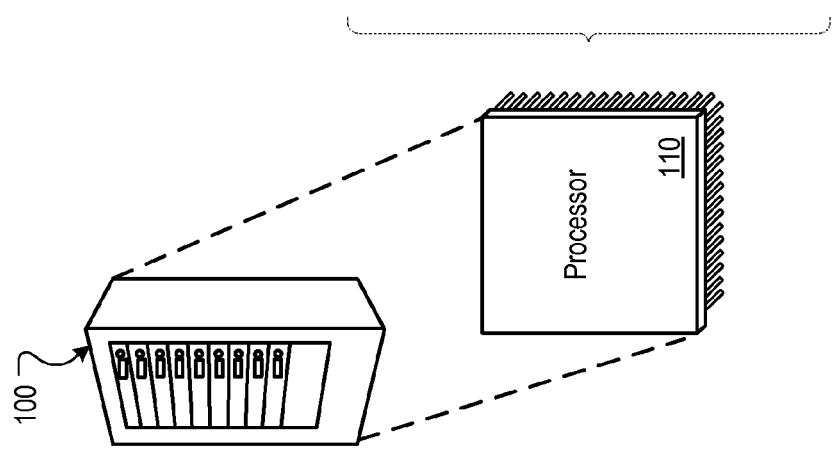

FIG. 1 is a block diagram of processes executing within a server 100. The server 100 is a computer system that executes software, for example, to respond to requests received from client systems (not shown). For example, the server 100 can be a web server that responds to requests from web clients such as web browsers.

The server has a processor 110 that executes instructions, for example, instructions defining software programs. When a software program is executed, the executed instructions are called a process. In the example shown, the processor 110 is executing a primary process 120 and a calling process 130. The primary process 120 is a process that can remain in execution on the processor until it is terminated by an event such as a user command or an instruction from another process. The primary process can receive requests from other processes and provide responses to the requests to the requesting processes. For example, the primary process 120 can receive requests from a calling process 130 and provide responses to the calling process 130. The calling process 130 "calls" the primary process 120 when the calling process 130 has tasks for the primary process 120 to perform.

In some implementations, either or both of the primary process 120 and the calling process 130 can access portions of memory 140 belonging to the server 100. For example, the memory 140 can be random-access memory capable of being read from and written to by processes executing on the server 100. The memory 140 is divided into multiple memory locations 150a, 150b, 150c, each having an address that a process can use to access the data stored at the corresponding memory location.

For example, a memory location 150a can store data representing a software object 160. A software object 160 is a collection of data encapsulated together. The data can include attributes (such as stored values that may undergo transformation) and can also include behaviors (such as collections of instructions, for example, methods, functions, procedures, and/or subroutines).

In some implementations, a software object 160 can be created by one process and accesses or modified by another process. For example, the primary process 120 can create the object. The object is created by generating (instantiating) the object and placing it in an unused memory location 150a. The process of placing data in an unused (free) memory location is called allocating the memory location 150a. When the object is no longer needed by any process, a process (e.g., the process that allocated the memory) marks the memory location 150a as free.

In some examples, the primary process 120 instantiates the software object 160 and provides a reference identifying the software object's memory location 150a to the calling process 130. For example, the software object 160 can be created in response to a request from the calling process 130. The calling process 130 can use the reference to access the software object's memory location 150a and access data associated with the software object 160.

In some implementations, the primary process 120 implements a callback mechanism (described in more detail in FIG. 2) that the calling process 130 can use to indicate that the calling process 130 has finished using the software object 160 so that the primary process 120 can deallocate the software object's memory location 150a.

Figure 2:
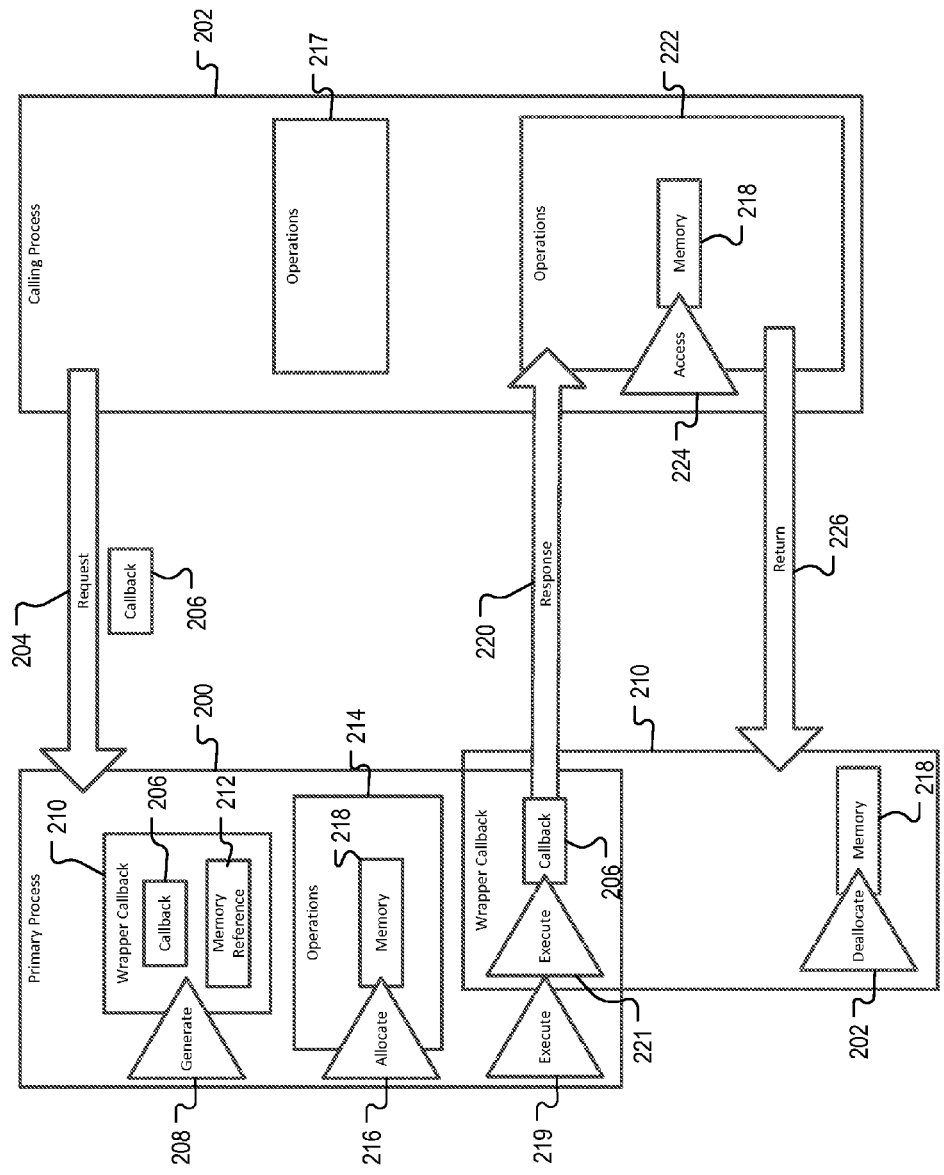
FIG. 2 is a flow diagram representing operations carried out by a primary process and a calling process.

FIG. 2 is a flow diagram representing operations carried out by a primary process 200 and a calling process 202. The calling process 202 makes a request 204 to the primary process 200. In some examples, the calling process 202 is a web server, and the primary process 200 is a process that handles data received from the web server, for example, a process that analyzes or transforms the data.

Included as part of the request is a callback 206. The callback 206 is an executable element that references the calling process 202, and when the callback 206 is executed, the referenced portion of the calling process 202 executes. In some implementations, if the referenced portion of the calling process 202 is dormant (previously in execution but temporarily suspended), the execution of the callback 206 activates the referenced dormant portion of the calling process 202.

When the primary process 200 receives the request 204 and the callback 206, the primary process generates 208 a wrapper callback 210. The wrapper callback 210 contains the first callback 206 and also contains a memory reference 212. The memory reference 212 identifies the location of memory that will be allocated and used to store data representing at least one software object that will be used by the primary process 200. The wrapper callback 210 also has instructions that can be executed to deallocate the memory identified by the memory reference 212.

The primary process 200 then performs operations 214, for example, operations in response to the request 204 made by the calling process 202. Among these operations, the primary process 200 allocates 216 the memory 218 identified by the memory reference 212. During this time, the calling process 202 can perform other operations 217 independent from and asynchronously relative to the primary process 200.

When the operations 214 in the primary process 200 are complete, the primary process executes 219 the wrapper callback 210. The wrapper callback 210 executes as a process independent of the primary process 200. As a result, the primary process 200 is free to engage in other operations unrelated to the request 204 made by the calling process 202.

For example, the primary process 200 could also become dormant or terminate, and the wrapper callback 210 would remain in execution.

Within the wrapper callback 210, the first callback 206 is executed 221. The execution of the first callback 206 serves as a response 220 to the calling process 202, which can then perform operations 222 that may depend on the response 220 from the primary process 200. For example, the operations 222 may depend on data (e.g., a software object) stored in the memory 218 that the primary process 200 allocated 216. In this example, the operations 222 include accessing 224 the memory 218. The operations 222 may be an executable portion of the calling process 202, for example, a method, procedure, or subroutine. When the operations 222 have completed, the calling process 202 can terminate (or go into a dormant state) after a return 226 to the wrapper callback 210. At this point, the wrapper callback 210 concludes its execution by deallocating 228 the memory 218 that was allocated 216 by the primary process 200 and accessed 224 by the calling process 202.

The wrapper callback 210 can be implemented as an instance of a wrapper callback software class. For example, the wrapper callback software class can have a constructor method (e.g., a procedure or function) that accepts another callback and a memory reference as an input. The wrapper callback software class can also have an execution method that is called by the primary process 200. The execution process executes the other callback and also deallocates the memory identified by the memory reference.

Figure 3:
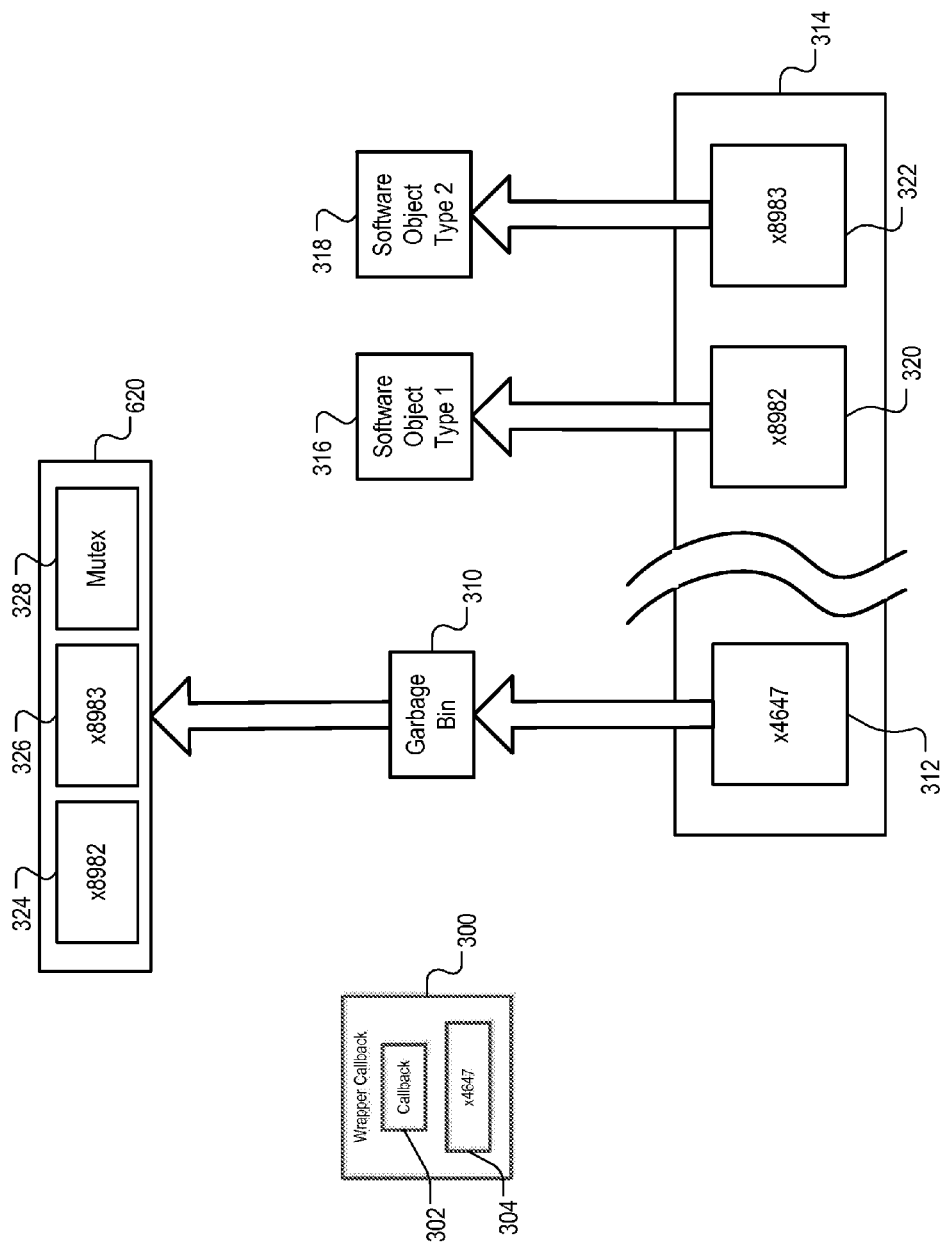
FIG. 3 is a diagram of the relationship between software objects and memory locations.

FIG. 3 is a diagram of the relationship between software objects and memory locations. In some examples, a wrapper callback 300 contains another callback 302 and also contains a reference 304 to a memory location containing a garbage bin object 310. The garbage bin object 310 contains references to memory locations of software objects of different type. The type of a software object identifies the particular arrangement of the data of the software object. The garbage bin object 310 is independent of the types of the software objects, so a garbage bin object can contain software objects of any type. However, the garbage bin object 310 need not contain information about the types of the typed software objects, because the garbage bin object is used to deallocate the memory allocated to the software objects, rather than manipulate the data associated with the software objects. Accordingly, the garbage bin object need only reference the storage location of the software objects.

The garbage bin object 310 can be stored at a memory location 312 of a memory 314 (for example, a memory of a server such as server 100 as shown in FIG. 1). Further, other software objects 316, 318 are stored at other memory locations 320, 322. References 324, 326 to the memory locations 320, 322 can be added to the garbage bin object 310. For example, a primary process can add the references 324, 326 to the garbage bin object 310, such as primary process 200 shown in FIG. 2. The garbage bin object 310 can then be used to access the software objects 316, 318 using the references 324, 326. The software objects 316, 318 can have multiple types. For example, one software object 316 can be of a first type, and the other software object 318 can be a second, different type.

The garbage bin object 310 can be used in the process shown in FIG. 2. For example, the primary process 200 can, instead of adding a memory reference 212 to the wrapper callback 210, the primary process 200 can add the garbage bin object 310 to the wrapper callback 210. The wrapper callback 210 can then deallocate the software objects referenced by the garbage bin object 310. Thus, multiple software objects can be deallocated by use of the garbage bin object. In general, all of the software objects referenced by the garbage bin object 310 are deallocated all at once by the wrapper callback 210.

A reference to a software object can be added to the garbage bin object 310 even after the garbage bin object 310 has been added to a wrapper callback 210. Thus, the wrapper callback 210 need only be generated to include a reference to the garbage bin 310. The wrapper callback 210 need not be modified as software objects are allocated and added to the garbage bin 310.

In some implementations, references 324, 326 can be added to the garbage bin object 310 by multiple entities, for example, multiple instances or threads of a process. A single garbage bin object 310 can be used with multiple threads of a process. The garbage bin object 310 can have a mutual exclusion variable 328 to maintain the state of the garbage bin object 310. For example, when a thread is adding a reference to the garbage bin object, the thread can set the mutual exclusion variable 328 to indicate that the garbage bin object 310 is in use. During this time, other threads can access the mutual exclusion variable 328 and wait until the mutual exclusion variable 328 indicates that no other thread is making modifications to the garbage bin object 310, e.g., add references to the garbage bin object 310. Once the mutual exclusion variable 328 indicates that no other thread is making modifications to the garbage bin object 310, another thread can set the mutual exclusion variable 328 and make modifications to the garbage bin object 310.

Figure 4:
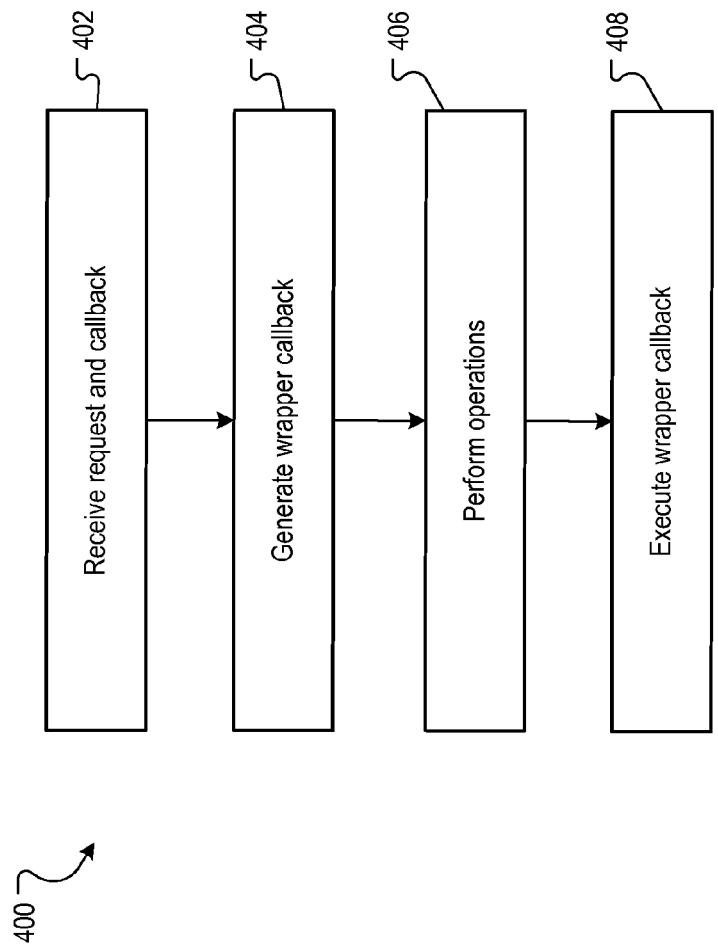
FIG. 4 is a flowchart of an example procedure for managing memory allocation asynchronously.

FIG. 4 is a flowchart of an example procedure 400 for managing memory allocation asynchronously. The procedure 400 can be used, for example, by a primary process 200 (FIG. 2) in a server 100 (FIG. 1).

The procedure 400 receives a request and a callback, for example, from another process such as a calling process (402). The callback can be used to return to the calling process after operations are completed, such as operations carried out to handle the request.

The procedure 400 generates a wrapper callback (404). The wrapper callback contains the original received callback as well as a reference to memory. The memory can be memory that will be allocated when operations to handle the request are carried out, for example, or the memory can contain a container object (e.g., a garbage bin object) that references multiple memory locations that will be allocated when operations to handle the request are carried out.

The procedure 400 performs operations, for example, operations in response to the request received from another process (406). The operations can include allocating memory that will be accessed by the calling process.

The procedure 400 executes the wrapper callback (408). The wrapper callback executes as a separate process and also executes the original received callback to return to the calling process. When the calling process has accessed the memory referenced by the wrapper callback (or referenced by a container object referenced by the wrapper callback), the wrapper callback deallocates the memory.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, comprising:
   receiving, by a first process and from a second process that is asynchronous to the first process:
      a request to perform operations; and
      a first callback referencing an executable portion of the second process;
   generating a wrapper callback referencing the first callback, the wrapper callback configured to deallocate a referenced memory location and cause execution of the referenced first callback when the wrapper callback is executed; and
   in response to performing the operations based on the request, the operations including allocating the referenced memory location, executing the wrapper callback, including executing the first callback and deallocating the referenced memory location subsequent to executing the first callback.

2. The method of claim 1, wherein the wrapper callback includes a reference to a container object referencing a plurality of memory locations to be deallocated, the memory locations having been allocated by the first process, and the references to the memory locations having been added to the container object by the first process.

3. The method of claim 2, further comprising checking a mutual exclusion variable prior to adding a reference to a memory location to the container object; and
   if the mutual exclusion variable indicates that the container object is not in use, adding a reference to a memory location to the container object; and
   if the mutual exclusion variable indicates that the container object is in use, waiting until the mutual exclusion variable changes, and when the mutual exclusion variable indicates that the mutual exclusion variable indicates that the container object is not in use.

4. The method of claim 2, wherein the plurality of memory locations represents a plurality of objects of multiple types.

5. The method of claim 1, wherein the second process comprises a web server and the first process comprises a service that processes data received from the web server.

6. A system, comprising:
   a data processing apparatus; and
   a memory coupled to the data processing apparatus having instructions stored thereon which, when executed by the data processing apparatus cause the data processing apparatus to perform operations comprising:
   receiving, by a first process and from a second process that is asynchronous to the first process:
      a request to perform operations; and
      a first callback referencing an executable portion of the second process;
   generating a wrapper callback referencing the first callback, the wrapper callback configured to deallocate a referenced memory location and cause execution of the referenced first callback when the wrapper callback is executed; and
   in response to performing the operations based on the request, the requested operations including allocating the referenced memory location, executing the wrapper callback, including executing the first callback and deallocating the referenced memory location subsequent to executing the first callback.

7. The system of claim 6, wherein the wrapper callback includes a reference to a container object referencing a plurality of memory locations to be deallocated, the memory locations having been allocated by the first process, and the references to the memory locations having been added to the container object by the first process.

8. The system of claim 7, the instructions stored on the memory also cause the data processing apparatus to perform operations comprising:
   checking a mutual exclusion variable prior to adding a reference to a memory location to the container object; and
   if the mutual exclusion variable indicates that the container object is not in use, adding a reference to a memory location to the container object; and
   if the mutual exclusion variable indicates that the container object is in use, waiting until the mutual exclusion variable changes, and when the mutual exclusion variable indicates that the mutual exclusion variable indicates that the container object is not in use.

9. The system of claim 7, wherein the plurality of memory locations represents a plurality of objects of multiple types.

10. The system of claim 6, wherein the second process comprises a web server and the first process comprises a service that processes data received from the web server.

11. Non-transitory computer readable media storing software comprising instructions executable by a processing device and upon such execution cause the processing device to perform operations comprising:
   receiving, by a first process and from a second process that is asynchronous to the first process:
      a request to perform operations; and
      a first callback referencing an executable portion of the second process;

generating a wrapper callback referencing the first callback, the wrapper callback configured to deallocate a referenced memory location and cause execution of the referenced first callback when the wrapper callback is executed; and in response to performing the operations based on the request, the requested operations including allocating the referenced memory location, executing the wrapper callback, including executing the first callback and deallocating the referenced memory location subsequent to executing the first callback.

12. The non-transitory computer readable media of claim 11, wherein the wrapper callback includes a reference to a container object referencing a plurality of memory locations to be deallocated, the memory locations having been allocated by the first process, and the references to the memory locations having been added to the container object by the first process.

13. The non-transitory computer readable media of claim 12, further comprising checking a mutual exclusion variable prior to adding a reference to a memory location to the container object; and if the mutual exclusion variable indicates that the container object is not in use, adding a reference to a memory location to the container object; and if the mutual exclusion variable indicates that the container object is in use, waiting until the mutual exclusion variable changes, and when the mutual exclusion variable indicates that the mutual exclusion variable indicates that the container object is not in use.

14. The non-transitory computer readable media of claim 12, wherein the plurality of memory locations represents a plurality of objects of multiple types.

15. The non-transitory computer readable media of claim 11, wherein the second process comprises a web server and the first process comprises a service that processes data received from the web server.

* * * * *